(12) United States Patent
Zeringue (10) Patent No.: US 10,697,860 B2
(45) Date of Patent: Jun. 30, 2020

(54) METHODS AND APPARATUS FOR PREDICTIVE FAILURE ANALYSIS OF A COOLING DEVICE

(71) Applicant: Polar Controller, Inc., Jacksonville, FL (US)

(72) Inventor: Kaleb Zeringue, Jacksonville, FL (US)

(73) Assignee: POLAR CONTROLLER, INC., Jacksonville, FL (US)

( * ) Notice: Subject to any disclaimer, the term of this patent is extended or adjusted under 35 U.S.C. 154(b) by 0 days.

(21) Appl. No.: 16/268,069

(22) Filed: Feb. 5, 2019

(65) Prior Publication Data

US 2019/0170613 A1    Jun. 6, 2019

Related U.S. Application Data

(63) Continuation-in-part of application No. 15/010,042, filed on Jan. 29, 2016, now Pat. No. 10,197,992.

(60) Provisional application No. 62/110,854, filed on Feb. 2, 2015.

(51) Int. Cl.
*F25B 49/00* (2006.01)
*F25B 49/02* (2006.01)
*G01M 99/00* (2011.01)

(52) U.S. Cl.
CPC ......... *G01M 99/002* (2013.01); *F25B 49/005* (2013.01); *F25B 49/02* (2013.01); *F25B 49/022* (2013.01); *F25B 49/025* (2013.01); *F25B 2300/00* (2013.01); *F25B 2313/031* (2013.01); *F25B 2500/06* (2013.01); *F25B 2700/151* (2013.01); *F25B 2700/19* (2013.01); *F25B 2700/2102* (2013.01); *F25B 2700/2104* (2013.01); *F25B 2700/2106* (2013.01)

(58) Field of Classification Search
CPC . G05B 19/41875; G07C 3/00; G01M 99/005; F25B 49/005
See application file for complete search history.

(56) References Cited

U.S. PATENT DOCUMENTS 6,082,623 A * 7/2000 Chang ............... G06F 1/206
236/49.3

* cited by examiner

*Primary Examiner* — Kyoung Lee
(74) *Attorney, Agent, or Firm* — Thomas C. Saitta (57) ABSTRACT

A predictive failure system for a cooling apparatus having sensors measuring operational components of a cooling apparatus to determine performance data and means to analyze the data to determine a performance profile, wherein anomalies in the performance profile are determined and the operator of the cooling apparatus is warned prior to failure of the operational components.

19 Claims, 5 Drawing Sheets

METHODS AND APPARATUS FOR PREDICTIVE FAILURE ANALYSIS OF A COOLING DEVICE

RELATED APPLICATIONS

This Patent Application is a continuation-in-part of U.S. patent application Ser. No. 15/010,042, filed Jan. 29, 2016, now U.S. Pat. No. 10,197,992, issued Feb. 5, 2019, claiming the benefit of U.S. Provisional Patent Application No. 62/110,854, filed on 2 Feb. 2015, titled METHODS AND APPARATUS FOR PREDICTIVE FAILURE ANALYSIS OF A COOLING DEVICE.

FIELD OF THE DISCLOSURE

The present disclosure relates to methods and apparatus for the measurement and collection of variable data. More specifically, the present disclosure presents a method of measuring changes in the efficiency of an electric motor and cooling device that may be integral to the operation of a refrigerator or freezer unit.

BACKGROUND OF THE DISCLOSURE

Traditionally, the method for diagnosing a malfunctioning cooling device is to follow a series of steps in diagnosis. Failures would be categorized, then organized into a list where the end user would find the specific symptom that the unit exhibits. Then the user would reference the symptom to the corresponding list of checks and possible problems. For example, if the freezer is not operating at an optimal temperature, the user may be instructed to check the condenser coils, the door seals, test the temperature control, and check for a refrigerant leak, etc.

The problem with this method is twofold. First, the user is limited to diagnosing failures that have already occurred rather than proactively addressing mechanical issues before they manifest symptoms. This diagnosis is generally limited to determining a mechanical issue by a change in cooling temperature. Second, diagnosis is dependent on the user having broad knowledge of the unit's operating components. While diagnosis may be a time-consuming effort if the user has broad knowledge, it will be particularly difficult for a user who is uninformed.

As the end user has additional cooling needs the addition of new units becomes necessary. This increases the likelihood that additional model types or brands may be used. This multiplies the amount of necessary information the user must know to successfully diagnose and repair issues and substantially increases the difficulty of diagnosis.

What is needed is a device that can intelligently record the performance characteristics of a cooling device and allow for the diagnosis of performance degradation or failure based on this data. Proactively addressing these issues is likely to save repair costs, prevent loss of service to the customer thereby allowing the user uninterrupted business, and finally to prevent spoilage.

SUMMARY OF THE INVENTION

The invention in general, as shown in various embodiments, is a predictive failure device, system and apparatus for monitoring a cooling or refrigeration apparatus configured to cool an enclosed area, such as for example a refrigerated room or a refrigeration cabinet in a grocery store. Sensors are associated with multiple operational components, e.g., compressors, fans, blowers, etc., of the cooling apparatus as well as areas of the refrigerated area, e.g., interior or exterior space, the sensors providing data which is communicated through a network access device to an external server. The external server analyzes the data with reference to data within an aggregate database, the aggregate database representing data received from a large number of cooling apparatuses of similar type spread over a large number of physical sites and over a long time period, the aggregate database being constantly updated with new data. The comparative analysis determines anomalies, i.e., early warning signs, in the data which are known indicators of imminent or future inefficiencies or failure in particular components of the cooling system. This predictive determination of imminent or future failure or inefficiencies is transmitted to proper personnel in order for action to be taken to correct for the anomalies, e.g., adjustment, repair of replacement of the particular components identified by the predictive failure system.

The invention comprises: a monitoring mechanism comprising at least one sensor configured to measure a predefined quality set of the cooling apparatus, wherein the predefined quality set comprises characteristics indicative of an effectiveness of at least one component of the cooling apparatus and is chosen from the group of predefined quality sets consisting of current flowing to the at least one component from a power source, current returning to a power source from the at least one component, temperature within the cooling apparatus, temperature external to the cooling apparatus, humidity within the cooling apparatus, humidity external to the cooling apparatus, and temperature of the at least one component; a communications network access device configured to access a server in logical communication with a digital communications network; and executable software stored on the communications network access device and executable on demand, the software operative with the communications network access device to cause the network access device to receive performance information from the monitoring mechanism for the predefined quality set and transmit the performance information to an external server.

Furthermore, the invention is as above, wherein the network access device is further caused to analyze the received performance information for the predefined quality set to determine a performance profile for the at least one component of the cooling apparatus; further comprising an analyzing mechanism configured to analyze the performance information for the predefined quality set, wherein the analysis determines the effectiveness of the at least one component of the cooling apparatus; wherein said monitoring mechanism comprises a sensor cluster; wherein said predictive failure device is integrated into the cooling apparatus; wherein said predictive failure device is physically separated from the cooling apparatus; wherein the network access device is further caused to analyze the received performance information for the predefined quality set to determine a performance profile for the cooling apparatus; and/or further comprising an analyzing mechanism configured to analyze the performance information for the predefined quality set, wherein the analysis determines the effectiveness of the cooling apparatus.

Alternatively, the invention in various embodiments is a predictive failure device for a cooling apparatus comprising: a monitoring mechanism comprising at least one sensor configured to measure a predefined quality set of the cooling apparatus, wherein the predefined quality set comprises characteristics indicative of an effectiveness of at least one component of the cooling apparatus and is chosen from the group of predefined quality sets consisting of current flowing to the at least one component from a power source, current returning to a power source from the at least one component, temperature within the cooling apparatus, temperature external to the cooling apparatus, humidity within the cooling apparatus, humidity external to the cooling apparatus, and temperature of the at least one component; a communications network access device configured to access a server in logical communication with a digital communications network; and executable software stored on the communications network access device and executable on demand, the software operative with the communications network access device to cause the network access device to receive performance information from the monitoring mechanism for the predefined quality set and transmit the performance information to an external server; an analyzing mechanism configured to analyze the performance information for the predefined quality set, wherein the analysis determines the effectiveness of the at least one component of the cooling apparatus; wherein the network access device is further caused to analyze the received performance information for the predefined quality set to determine a performance profile for the at least one component of the cooling apparatus.

Furthermore, such invention wherein said monitoring mechanism comprises a sensor cluster; wherein said predictive failure device is integrated into the cooling apparatus; wherein said predictive failure device is physically separated from the cooling apparatus; wherein the network access device is further caused to analyze the received performance information for the predefined quality set to determine a performance profile for the cooling apparatus; further comprising an analyzing mechanism configured to analyze the performance information for the predefined quality set, and/or wherein the analysis determines the effectiveness of the cooling apparatus.

Still alternatively summarized, the invention is a predictive failure device for a cooling apparatus comprising: a monitoring mechanism comprising at least one sensor configured to measure a predefined quality set of the cooling apparatus, wherein the predefined quality set comprises characteristics indicative of an effectiveness of at least one component of the cooling apparatus and is chosen from the group of predefined quality sets consisting of current flowing to the at least one component from a power source, current returning to a power source from the at least one component, temperature within the cooling apparatus, temperature external to the cooling apparatus, humidity within the cooling apparatus, humidity external to the cooling apparatus, and temperature of the at least one component; a communications network access device configured to access a server in logical communication with a digital communications network; and executable software stored on the communications network access device and executable on demand, the software operative with the communications network access device to cause the network access device to receive performance information from the monitoring mechanism for the predefined quality set and transmit the performance information to an external server; an analyzing mechanism configured to analyze the performance information for the predefined quality set, wherein the analysis determines the effectiveness of the at least one component of the cooling apparatus; wherein the network access device is further caused to analyze the received performance information for the predefined quality set to determine a performance profile for the at least one component of the cooling apparatus; wherein the network access device is further caused to analyze the received performance information for the predefined quality set to determine a performance profile and the effectiveness for the cooling apparatus.

And furthermore wherein said predictive failure device is integrated into the cooling apparatus; and/or wherein said predictive failure device is physically separated from the cooling apparatus.

Alternatively, the invention is a predictive failure system for a cooling apparatus for an enclosed area, the cooling apparatus having operational components, the system comprising: a monitoring mechanism comprising sensors configured to measure performance data of a plurality of the operational components of the cooling apparatus, wherein the sensors are associated with a plurality of the operational components chosen from the group of operational components consisting of a compressor, a cooling fan, one or more blowers, low side pressure and high side pressure conduits, and low temperature and high temperature conduits; a communications network access device configured to access a server in logical communication with a digital communications network; and executable software stored on the communications network access device and executable on demand, the software operative with the communications network access device to cause the network access device to receive performance data from the sensors and transmit the performance data to an external server.

Furthermore, such an invention wherein the network access device is further caused to analyze the received performance data to determine a performance profile for the plurality of operational components of the cooling apparatus; further comprising an analyzing mechanism configured to analyze the performance data for the plurality of operational components of the cooling apparatus, wherein the analysis determines the effectiveness of the plurality of operational components of the cooling apparatus; wherein said monitoring mechanism comprises a sensor cluster; wherein said predictive failure system is integrated into the cooling apparatus; wherein said predictive failure system is physically separated from the cooling apparatus; wherein the network access device is further caused to analyze the received performance data for the plurality of operational components of the cooling apparatus to determine a performance profile for the cooling apparatus; further comprising an analyzing mechanism configured to analyze the performance data for the plurality of operational components of the cooling apparatus, wherein the analysis determines the effectiveness of the cooling apparatus; wherein the sensors associated with the plurality of operational components comprise a current transducer associated with the compressor, a current transducer associated with cooling fan, a current transducer associated with the one or more blowers, pressure gauges associated with the low side pressure and high side pressure conduits, and thermocouples associated with the low temperature and high temperature conduits; and/or further comprising sensors measuring temperature and humidity internally to and externally to the enclosed area.

Alternatively still, the invention is a predictive failure system for a plurality of cooling apparatuses for enclosed areas, each of the cooling apparatuses having operational components, the system comprising: a monitoring mechanism comprising sensors configured to measure performance data of a plurality of the operational components of the cooling apparatuses, wherein the sensors are associated with a plurality of the operational components chosen from the group of operational components consisting of a compressor, a cooling fan, one or more blowers, low side pressure and high side pressure conduits, and low temperature and high temperature conduits; a communications network access device configured to access a server in logical communication with a digital communications network; executable software stored on the communications network access device and executable on demand, the software operative with the communications network access device to cause the network access device to receive performance data from the sensors and transmit the performance data to an external server; an analyzing mechanism configured to analyze the performance data from the sensors, wherein the analysis determines the effectiveness of the plurality of operational components of the cooling apparatuses; wherein the network access device is further caused to analyze the received performance data from the sensors to determine a performance profile for the plurality of operational components of the cooling apparatuses.

Furthermore, this invention wherein the performance data from all of said sensors are aggregated and used to determine the effectiveness of the plurality of operational components of any one of the cooling apparatuses; wherein the performance data comprises performance data received over time; wherein the sensors associated with the plurality of operational components comprise a current transducer associated with the compressor, a current transducer associated with cooling fan, a current transducer associated with the one or more blowers, pressure gauges associated with the low side pressure and high side pressure conduits, and thermocouples associated with the low temperature and high temperature conduits; further comprising sensors measuring temperature and humidity internally to and externally to the enclosed area.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for a system, method and device to monitor the operational efficiency of a cooling unit. This device may be used in conjunction with a display device or a communications network.

The invention in general, as shown in various embodiments, is a predictive failure device, system and apparatus for monitoring a cooling or refrigeration apparatus configured to cool an enclosed area, such as for example a refrigerated room or a refrigeration cabinet in a grocery store. Sensors are associated with multiple operational components, e.g., compressors, fans, blowers, etc., of the cooling apparatus as well as areas of the refrigerated area, e.g., interior or exterior space, the sensors providing data which is communicated through a network access device to an external server. The external server analyzes the data with reference to data within an aggregate database, the aggregate database representing data received from a large number of cooling apparatuses of similar type spread over a large number of physical sites and over a long time period, the aggregate database being constantly updated with new data. The comparative analysis determines anomalies, i.e., early warning signs, in the data which are known indicators of imminent or future inefficiencies or failure in particular components of the cooling system. This predictive determination of imminent or future failure or inefficiencies is transmitted to proper personnel in order for action to be taken to correct for the anomalies, e.g., adjustment, repair of replacement of the particular components identified by the predictive failure system.

In the following sections, detailed descriptions of examples and methods of the disclosure will be given. The description of both preferred and alternative examples though thorough are exemplary only, and it is understood that to those skilled in the art that variations, modifications, and alterations may be apparent. It is therefore to be understood that the examples do not limit the broadness of the aspects of the underlying disclosure as defined by the claims.

The term "Predictive Failure System" as used herein refers to a system that is configured to actively predict failure of a cooling device, such as a refrigerator, freezer or refrigerated room. In some embodiments, the predictive failure system may comprise one or more of a monitoring mechanism, analyzing mechanism, and measuring mechanism, wherein the mechanisms may manage data acquired from the cooling device. In some embodiments, the management of the data may allow the predictive failure device to actively track the efficiency and/or operational quality of the cooling device and/or its components. In some embodiments, the data may comprise the electrical usage of a cooling unit.

The term "Performance Data" as used herein refers to accumulated data that may be processed to assess the performance of a cooling unit.

The term "Performance Profile" as used herein refers to performance data and other data used to create an expected range of performance under set circumstances for a cooling unit, wherein in the other data consists of aggregated performance data from multiple cooling units from multiple sites.

Figure 1:
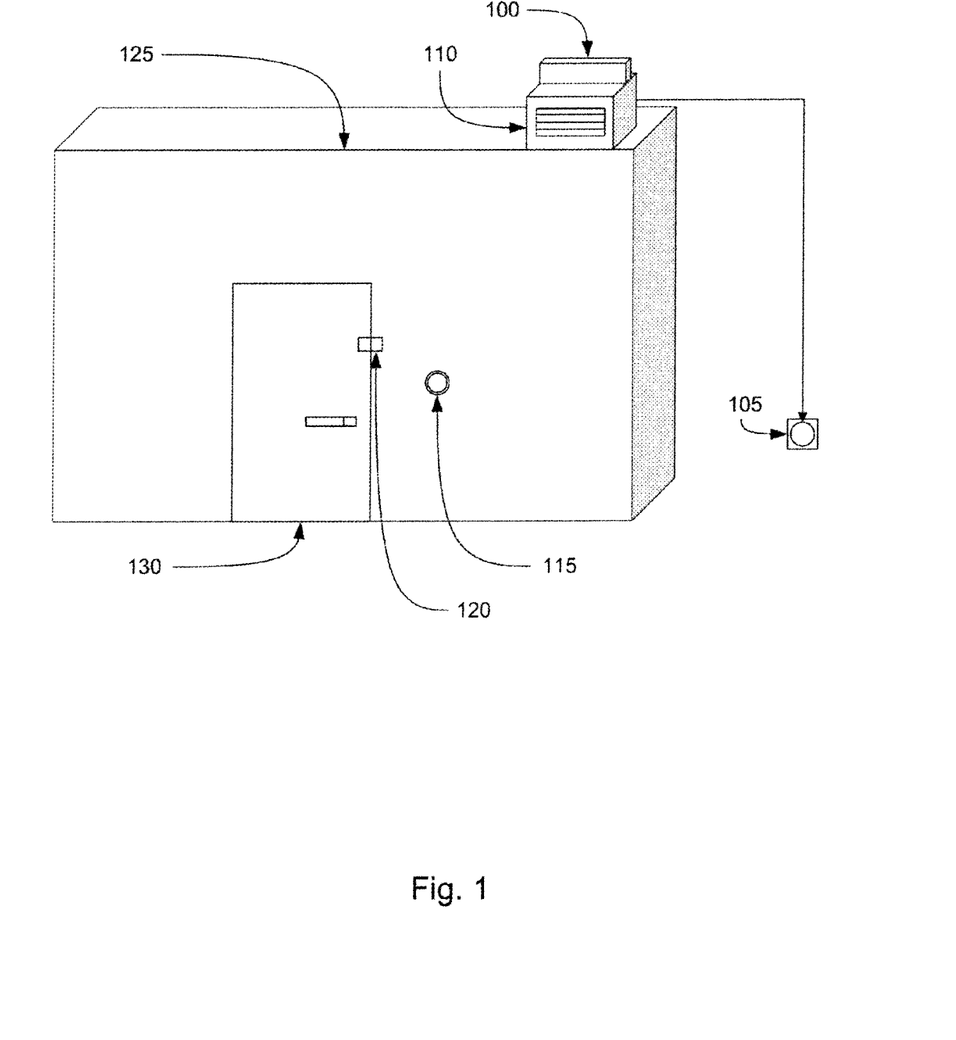
FIG. 1 illustrates an exemplary cooling unit with a predictive failure device, wherein the predictive failure device may be attached to the motor unit.

Referring now to FIG. 1, an exemplary embodiment of a predictive failure system 100 affixed to a cooling apparatus 110 of an enclosed area 124, wherein the predictive failure system 100 may be integrated to measure the efficiency of cooling apparatus 110, is illustrated. In some aspects, the predictive failure system 100 may be fully or partially integrated into the interior of the cooling apparatus 110. The predictive failure system 100 may measure the current flowing from the power source 105. In some embodiments, the predictive failure system 100 may measure the current flowing to the system 100 and the current returned to the power source 105. In some other aspects, the predictive failure system 100 may measure the current flowing from the power source 105, the current returned to the power source 105, or any combination thereof.

The collection of data in FIG. 1 may include, in any combination, data input from a sensor cluster 115 measuring the interior temperature of the enclosed area 125 and the exterior temperature of the enclosed area 125, as well as the interior humidity level of the enclosed area 125 and the exterior humidity level of the enclosed area 125. Furthermore, door open/close sensor 120 may provide data about the instances and duration of door 130 openings. This additional sensor information may be gathered by the monitoring unit either through wired or wireless communication.

In some embodiments, the predictive failure system 100 may comprise a monitoring mechanism, which may be programmed to monitor a predefined quality set. The predefined quality set may comprise characteristics of one or more the cooling device or a component within the cooling device, wherein the characteristics may be indicative of the effectiveness and/or efficiency of one or more the cooling device or a component within the cooling device. In some aspects, the predefined quality set may comprise one or more of current, temperature within the cooling device, temperature of one or more electrical components, electricity usage.

Figure 2:
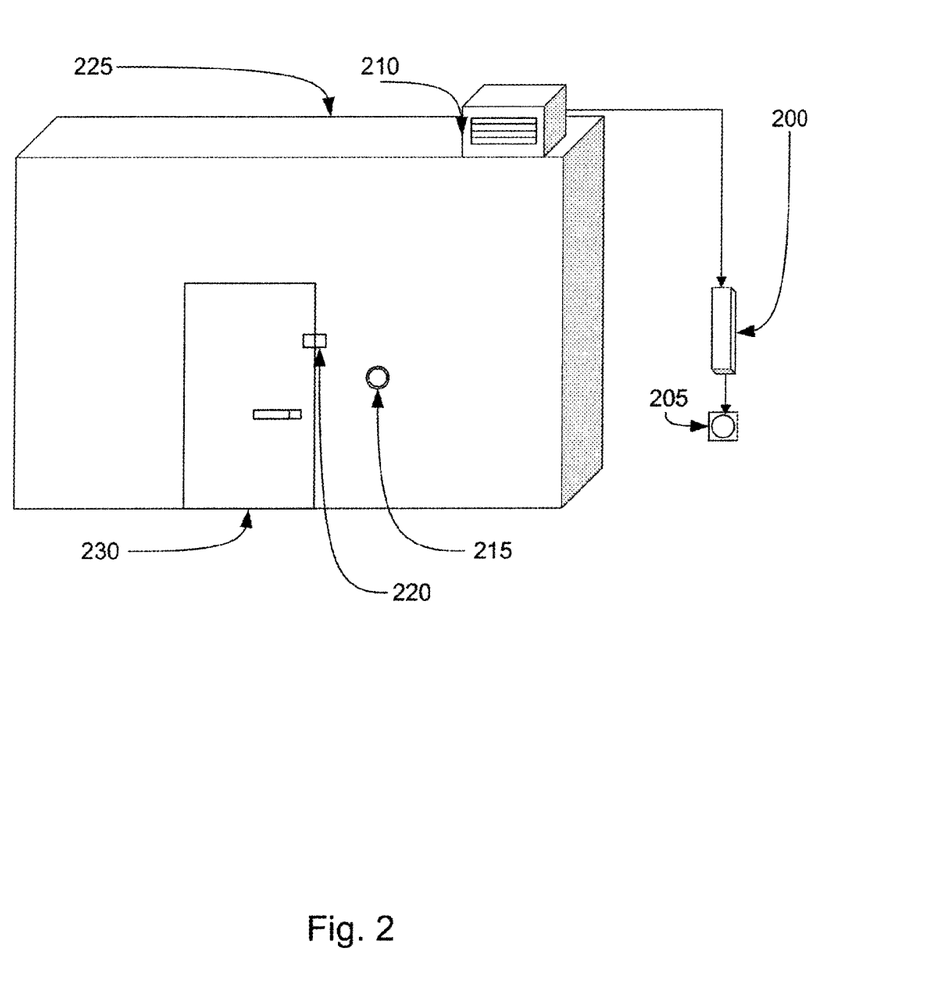
FIG. 2 illustrates an exemplary cooling unit with a predictive failure device, wherein the predictive failure device may be separate from the cooling unit and connected to the power source.

In some implementations, the monitoring mechanism may receive data regarding the predefined quality and may detect fluctuations that may indicate a decrease in effectiveness and/or efficiency, which may lead to a failure of the cooling device and/or a component of the cooling device. In some embodiments, the predictive failure system 100 may further comprise an analyzing mechanism, which may analyze the monitored data, wherein the analysis may assess and/or quantify the effectiveness and/or efficiency. The analysis may further predict when the cooling device or the component may fail if no adjustments or repairs are made. In some aspects, the monitored data may be transmitted to an external device, which may execute the analysis. Referring now to FIG. 2, an exemplary embodiment of a predictive failure system 200 independently located from the enclosed area 225, wherein the predictive failure system 200 may measure the efficiency of the enclosed area 225, is illustrated. The predictive failure system 200 may measure the current flowing from the power source 205 to the cooling apparatus 210. In some other examples, the predictive failure system 200 may measure the current flowing to the device and the current returned to power source 205, or any combination thereof.

The collection of data in FIG. 2 may also include in any combination data input from a sensor cluster 215 measuring the interior temperature of the enclosed area 225 and the exterior temperature of the enclosed area 225 as well as the interior humidity level of the enclosed area 225 and the exterior humidity level of the enclosed area 225. Furthermore door open/close sensor 220 may provide data about the instances and duration of door 230 openings. This additional sensor information may be gathered by the monitoring unit either through wired or wireless communication.

Figure 3:
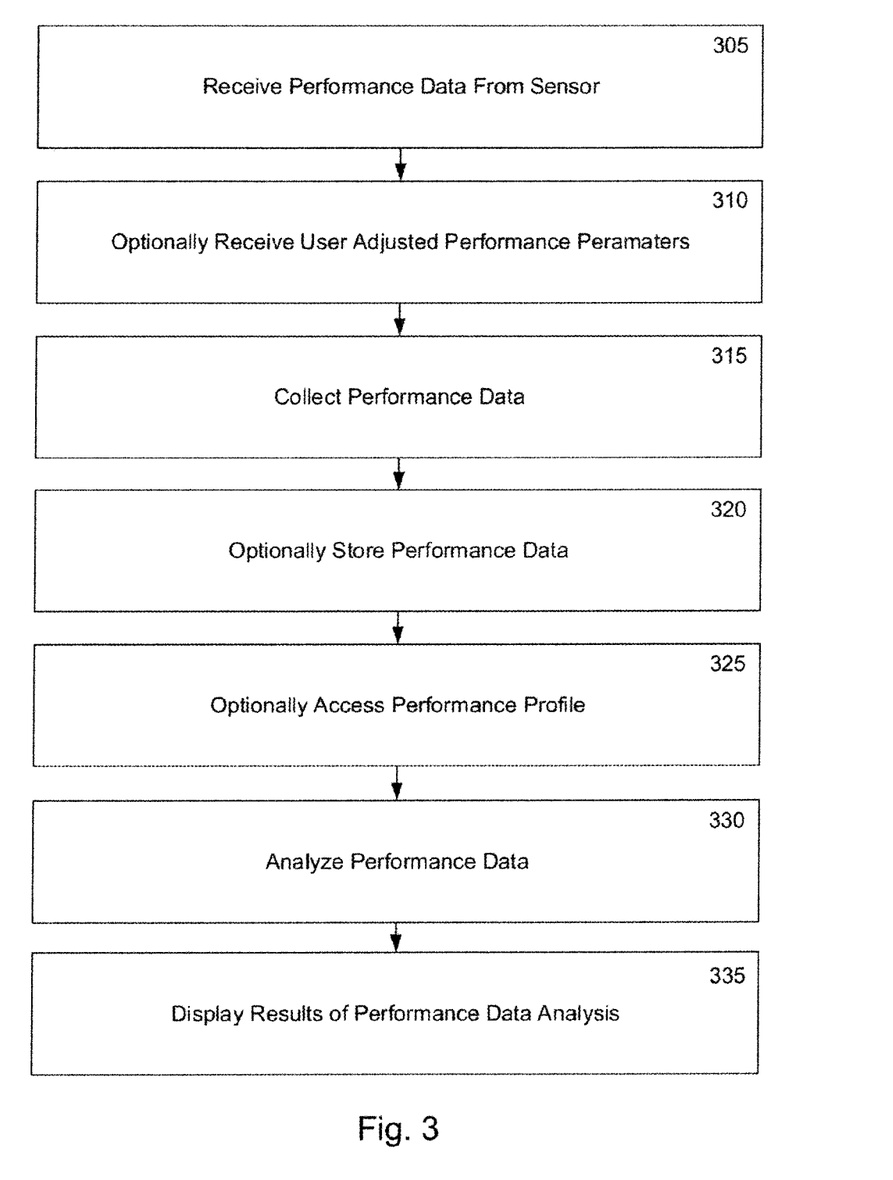
FIG. 3 illustrates exemplary method steps for collection and analysis of performance data.

Referring now to FIG. 3, exemplary method steps for the collection, analysis, and display of data are illustrated. In some embodiments at 305, performance data may be received for example from a sensor. The source of the Sensor output data may comprise but is not limited to sensors detecting electrical use, temperature, humidity, and door openings.

In some embodiments at 310, performance data may optionally be received from a user, wherein a user may comprise a manager, technician or owner. Optional performance data may comprise any data that the user may input through the display device or directly into the data collection center, for example.

In some embodiments at 310, performance data may comprise data inputted into the system about a malfunctioning status of a door, which may allow the door to only partially close. In some embodiments, the predictive failure device may analyze the system as malfunctioning and therefore emit an alarm. The user may prefer to change the measured parameters to adjust for the malfunctioning door, wherein the adjustment may allow the user to continue to use the predictive failure device without receiving alarms.

In some embodiments at 315, performance data may be stored, wherein the data may be accessible for future use.

In some embodiments at 320, the performance data may be stored for long term storage. In some implementations, this data may be used to create a profile of the cooling unit's performance over the lifetime of the unit. In some embodiments, the performance data may be used to create a performance profile of the cooling unit.

In some embodiments at 325, the performance profile of the cooling unit may be accessed. In some implementations, the performance profile may comprise the expected performance characteristics of the unit during various malfunctions.

In some embodiments at 330, performance data may be analyzed using various methods to determine the current performance of the cooling unit. In some embodiments, analysis may comprise an assessment of an expected range of power consumption for a performance level of the cooling unit, wherein the assessment may determine when the performance may be outside the expected range, and the unit may be malfunctioning or in need of a service. In some implementations, analysis may compute from the historic performance of the cooling unit for the historic performance of the cooling unit during a time of day, a calendar day, or a combination of both. In some embodiments, analysis may be based on an efficiency rating that may compute the expected peak efficiency performance of the unit and the cooling unit's actual performance in comparison to the efficiency rating. In some embodiments, analysis may also involve an aggregation of occurrences of the door opening categorized by a twenty-four-hour clock or by calendar day. In some embodiments, analysis may utilize predictive modeling to estimate future performance.

In some embodiments at 335, analyzed performance data may be displayed to the user in a manner that may provide useful, accurate, and understandable information. Examples of data display devices may comprise electronic display devices, IPAD, tablet device, analog display, and lights. Some embodiments of displaying results may require user authentication to access the information. Some embodiments of displaying results may also require additional hardware interface to display results.

Figure 4:
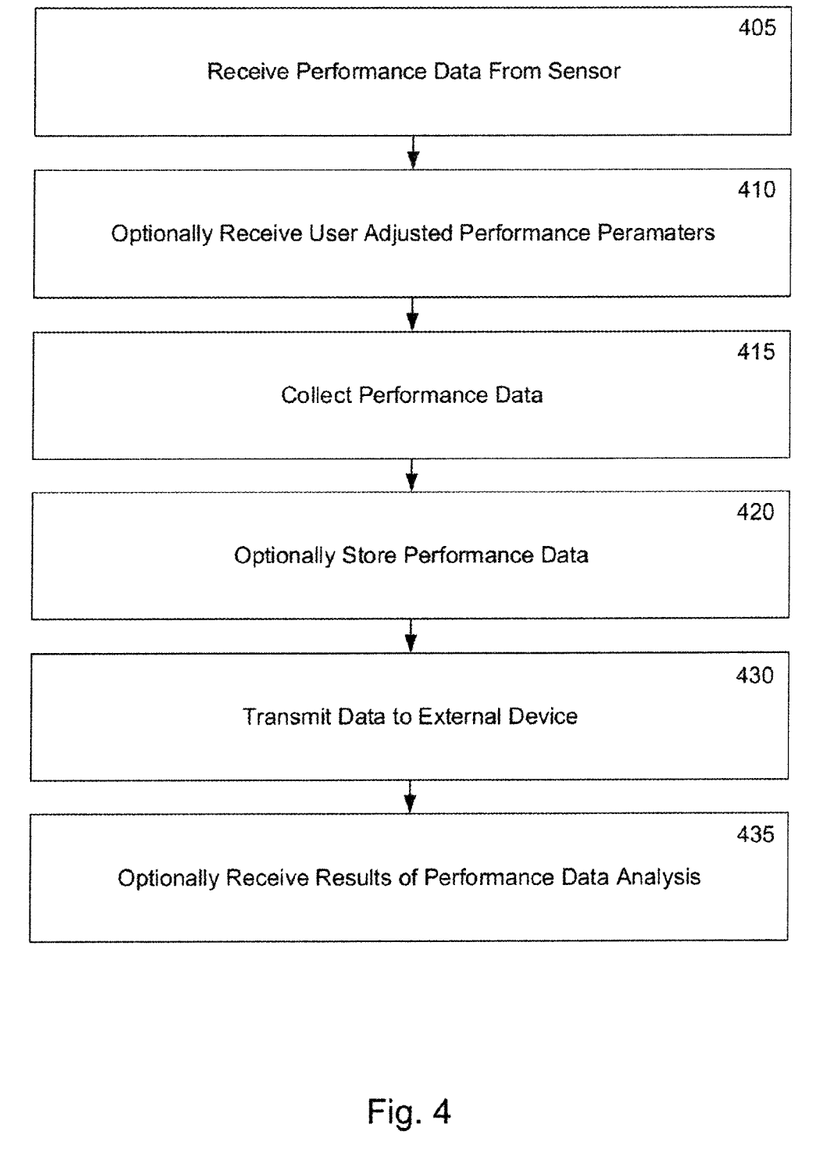
FIG. 4 illustrates exemplary method steps for collecting and transmitting collected performance data to an external device for analysis, wherein the external device may return analyzed data to the predictive failure device for local display.

Referring now to FIG. 4, exemplary method steps for transmission of performance data to an external device, wherein analysis of the performance data may be performed by the external device, are illustrated. In some embodiments at 405, performance data may be received for example from a sensor. In some embodiments at 410, performance data may optionally be received from a user, wherein a user may comprise a manager, technician or owner. In some embodiments at 415, data may be stored, wherein the data may be accessible for future use. In some embodiments at 420, the performance data may be stored for long term storage.

In some embodiments at 430, performance data may be transmitted to an external device. In some implementations, data may be transmitted through internet protocol (IP), through cellular communication, or through both. In some implementations, there may be a battery back up to allow the transmission of performance data to an external device during a power outage. In some embodiments at 435, performance data may be received from an external device.

Figure 5:
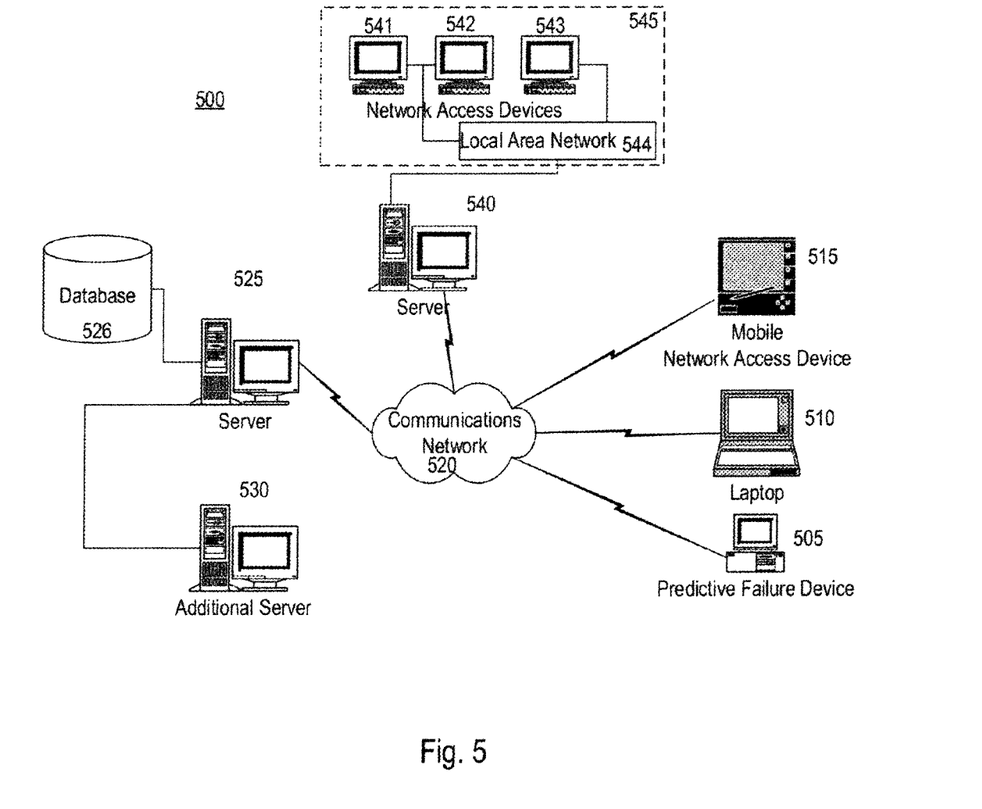
FIG. 5 illustrates an exemplary processing and interface system.

Referring now to FIG. 5, an exemplary processing and interface system 500 is illustrated. In some aspects, access devices 515, 510, 505, such as a predictive failure device 505, a mobile device 515 or laptop computer 510 may be able to communicate with an external server 525 though a communications network 520. The external server 525 may be in logical communication with a database 526, which may comprise data related to identification information and associated profile information. In some examples, the server 525 may be in logical communication with an additional server 530, which may comprise supplemental processing capabilities.

In some aspects, the server 525 and access devices 505, 510, 515 may be able to communicate with a cohost server 540 through a communications network 520. The cohost server 540 may be in logical communication with an internal network 545 comprising network access devices 541, 542, 543 and a local area network 544. For example, the cohost server 540 may comprise a payment service, such as PayPal or a social network, such as Facebook or a dating website.

The components of a representative cooling apparatus may comprise for example a compressor, a cooling fan, one or more blowers within the enclosed area, low side pressure and high side pressure conduits for the refrigerant fluid, and low temperature and high temperature conduits. The predictive failure system 100/200 will comprise various sensors associated with particular components, the sensors able to measure performance data for its associated component. Thus, predictive failure system 100/200 may comprise a current transducer to measure changes in amperage related to the compressor, such changes possibly predicting a windings failure, a bad disk or pistons, or other problems in the compressor motor. The predictive failure system 100/200 may comprise a current transducer to measure any changes in amperage related to the cooling fan, such changes possibly predicting a windings failure, fan blockage, failing bearings or an oil leak. The predictive failure system 100/200 may comprise pressure gauges to monitor the pressure within the low side and high side conduits to ascertain blockages possibly caused by contaminants or bad metering devices. The predictive failure system 100/200 may comprise thermocouples to monitor changes in temperatures in the low and high temperature conduits. The predictive failure system 100/200 may comprise temperature sensors positioned within the enclosed area and external to the enclosed area. The predictive failure system 100/200 may comprise door monitors to monitor the condition of the enclosure door. Most preferably, the predictive failure system 100/200 comprise the majority or all of the above referenced sensors.

In one embodiment, the predictive failure system 100/200 may be utilized to monitor a single or multiple cooling apparatuses at one physical site, with historical data being collected to provide a baseline of values sensor values for optimum efficiency. This is not based on utilizing the "factory setting" data for operational components provided by the manufacturers, but instead is in effect "customized" data applicable to the particular components in view of the localized conditions and environment encountered by the cooling apparatus, the construction and insulating characteristics of the enclosed area being cooled, variations in storage volume utilized over time, variations in access over time, etc. Thus, rather than merely comparing sensed data to factory settings, degradation or inefficiency parameters or baselines are determined, these parameters indicating future component failure if not addressed. These baselines or parameters are fluid over time as the environmental factors vary and may be based on data from the sensors of a single type of component that is used to predict failure of that component, or on data from different sensors on different components which in combination provide the prediction.

Most preferably, the predictive failure system 100/200 aggregates data from multiple sites, such that the aggregated data is used to develop more precise degradation or inefficiency parameters or baselines. Rather than being limited to a few cooling apparatuses at a single location, the system 100/200 preferably takes into account data from hundreds or thousands of cooling apparatuses at various locations. This greatly increases the predictive reliability.

When the performance data of an individual cooling apparatus does not fall within the desired performance profile for the cooling apparatus, the anomaly is determined by the predictive failure system 100/200 and a warning alert is transmitted to inform the operator of the cooling unit that corrective steps need to be undertaken to avoid failure of the cooling unit.

In a flow chart format, the predictive failure system 100/200 comprises the method steps of
(1) developing and installing the sensor systems in the cooling apparatuses;
(2) determining the optimum operating conditions and parameters for the operating components of the cooling apparatuses;
(3) providing software to analyze and determine fault conditions;
(4) developing a large library or archive of aggregate data to improve the predictive ability of the software; and
(5) providing centralized computing and monitoring of the system.

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

I claim:

1. A predictive failure system for a cooling apparatus for an enclosed area, the cooling apparatus having operational components, the system comprising:
   a monitoring mechanism comprising sensors configured to measure performance data of a plurality of the operational components of the cooling apparatus, wherein the sensors are associated with a plurality of the operational components chosen from the group of operational components consisting of a compressor, a cooling fan, one or more blowers, low side pressure and high side pressure conduits, and low temperature and high temperature conduits;
   a communications network access device configured to access a server in logical communication with a digital communications network; and
   executable software stored on the communications network access device and executable on demand, the software operative with the communications network access device to cause the network access device to receive performance data from the sensors and transmit the performance data to an external server.

2. The predictive failure system of claim 1, wherein the network access device is further caused to analyze the received performance data to determine a performance profile for the plurality of operational components of the cooling apparatus.

3. The predictive failure system of claim 1 further comprising an analyzing mechanism configured to analyze the performance data for the plurality of operational components of the cooling apparatus, wherein the analysis determines the effectiveness of the plurality of operational components of the cooling apparatus.

4. The predictive failure system of claim 1, wherein said monitoring mechanism comprises a sensor cluster.

5. The predictive failure system of claim 1, wherein said predictive failure system is integrated into the cooling apparatus.

6. The predictive failure system of claim 1, wherein said predictive failure system is physically separated from the cooling apparatus.

7. The predictive failure system of claim 1, wherein the network access device is further caused to analyze the received performance data for the plurality of operational components of the cooling apparatus to determine a performance profile for the cooling apparatus.

8. The predictive failure system of claim 1 further comprising an analyzing mechanism configured to analyze the performance data for the plurality of operational components of the cooling apparatus, wherein the analysis determines the effectiveness of the cooling apparatus.

9. The predictive failure system of claim 1, wherein the sensors associated with the plurality of operational components comprise a current transducer associated with the compressor, a current transducer associated with cooling fan, a current transducer associated with the one or more blowers, pressure gauges associated with the low side pressure and high side pressure conduits, and thermocouples associated with the low temperature and high temperature conduits.

10. The predictive failure system of claim 9, further comprising sensors measuring temperature and humidity internally to and externally to the enclosed area.

11. The system of claim 9, wherein the performance data from all of said sensors are aggregated and used to determine the effectiveness of the plurality of operational components of any one of the cooling apparatuses.

12. The system of claim 11, wherein the performance data comprises performance data received over time.

13. The system of claim 9, wherein the sensors associated with the plurality of operational components comprise a current transducer associated with the compressor, a current transducer associated with cooling fan, a current transducer associated with the one or more blowers, pressure gauges associated with the low side pressure and high side pressure conduits, and thermocouples associated with the low temperature and high temperature conduits.

14. The predictive failure system of claim 13, further comprising sensors measuring temperature and humidity internally to and externally to the enclosed area.

15. The system of claim 11, wherein the sensors associated with the plurality of operational components comprise a current transducer associated with the compressor, a current transducer associated with cooling fan, a current transducer associated with the one or more blowers, pressure gauges associated with the low side pressure and high side pressure conduits, and thermocouples associated with the low temperature and high temperature conduits.

16. The predictive failure system of claim 15, further comprising sensors measuring temperature and humidity internally to and externally to the enclosed area.

17. The system of claim 12, wherein the sensors associated with the plurality of operational components comprise a current transducer associated with the compressor, a current transducer associated with cooling fan, a current transducer associated with the one or more blowers, pressure gauges associated with the low side pressure and high side pressure conduits, and thermocouples associated with the low temperature and high temperature conduits.

18. The predictive failure system of claim 17, further comprising sensors measuring temperature and humidity internally to and externally to the enclosed area.

19. A predictive failure system for a plurality of cooling apparatuses for enclosed areas, each of the cooling apparatuses having operational components, the system comprising:
   a monitoring mechanism comprising sensors configured to measure performance data of a plurality of the operational components of the cooling apparatuses, wherein the sensors are associated with a plurality of the operational components chosen from the group of operational components consisting of a compressor, a cooling fan, one or more blowers, low side pressure and high side pressure conduits, and low temperature and high temperature conduits;
   a communications network access device configured to access a server in logical communication with a digital communications network;
   executable software stored on the communications network access device and executable on demand, the software operative with the communications network access device to cause the network access device to receive performance data from the sensors and transmit the performance data to an external server;

an analyzing mechanism configured to analyze the performance data from the sensors, wherein the analysis determines the effectiveness of the plurality of operational components of the cooling apparatuses;

wherein the network access device is further caused to analyze the received performance data from the sensors to determine a performance profile for the plurality of operational components of the cooling apparatuses.

* * * * *